(12) United States Patent
Bienewald et al.

(10) Patent No.: US 11,954,153 B2
(45) Date of Patent: Apr. 9, 2024

(54) KNOWLEDGE INSIGHT CAPTURING SYSTEM

(71) Applicant: BASF SE, Ludwigshafen (DE)

(72) Inventors: Frank Bienewald, Ludwigshafen (DE); Henning Schwabe, Ludwigshafen (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 17/483,366

(22) Filed: Sep. 23, 2021

(65) Prior Publication Data

US 2022/0092123 A1   Mar. 24, 2022

(30) Foreign Application Priority Data

Sep. 24, 2020   (EP) ..................... 20198048

(51) Int. Cl.
*G06F 16/903* (2019.01)
*G06F 16/93* (2019.01)

(52) U.S. Cl.
CPC ........ *G06F 16/90344* (2019.01); *G06F 16/93* (2019.01)

(58) Field of Classification Search
CPC ........ G06F 40/30; G06F 16/93; G06F 40/205; G06F 16/3344; G06F 16/951; G06N 20/00
See application file for complete search history.

(56) References Cited

U.S. PATENT DOCUMENTS

| | | |
|---|---|---|
| 6,778,979 B2 | 8/2004 | Grefenstette et al. |
| 8,620,909 B1 | 12/2013 | Rennison |
| 2003/0084066 A1 | 5/2003 | Waterman et al. |
| 2012/0078945 A1* | 3/2012 | Hurst ...................... G06F 16/94 707/E17.069 |
| 2016/0350362 A1* | 12/2016 | Charlot ............. G06F 16/24578 |
| 2019/0266158 A1* | 8/2019 | Bolla ....................... G06F 16/93 |

OTHER PUBLICATIONS

Nikhita Vedula et al, "Enriching Taxonomies With Functional Domain Knowledge", Publication: SIGIR '18: The 41st International ACM SIGIR Conference on Research & Development in Information Retrieval, Jun. 2018, pp. 745-754, https://doi.org/10.1145/3209978.3210000.

King Meng et al, "Self-Supervised Contextual Language Representation of Radiology Reports to Improve the Identification of Communication Urgency", AMIA Jt Summits Transl Sci Proc. 2020; 2020: 413-421, May 30, 2020.

Nick Tahamtan, describes in "IDC Whitepaper, How Semantic Technologies Enable Domain Experts to Steer Cognitive Applications", published in Jul. 2017.

\* cited by examiner

*Primary Examiner* — Hau H Hoang
(74) *Attorney, Agent, or Firm* — Lowenstein Sandler LLP

(57) ABSTRACT

A computer-implemented method for storage of digital information data via at least one processing unit (110) operatively coupled to at least one database is proposed. In at least one embodiment, the method comprises: providing at least one portion of the digital information data; performing at least one syntactic and/or semantic search in the at least one database based upon the portion of the digital information data; providing one or more meta-data strings in response to the at least one syntactic and/or semantic search; receiving at least one relevant meta-data string; and storing the portion of digital information data and the at least one relevant meta-data string. In at least one embodiment, the at least one relevant meta-data string is usable for a future syntactic and/or semantic search.

15 Claims, 5 Drawing Sheets

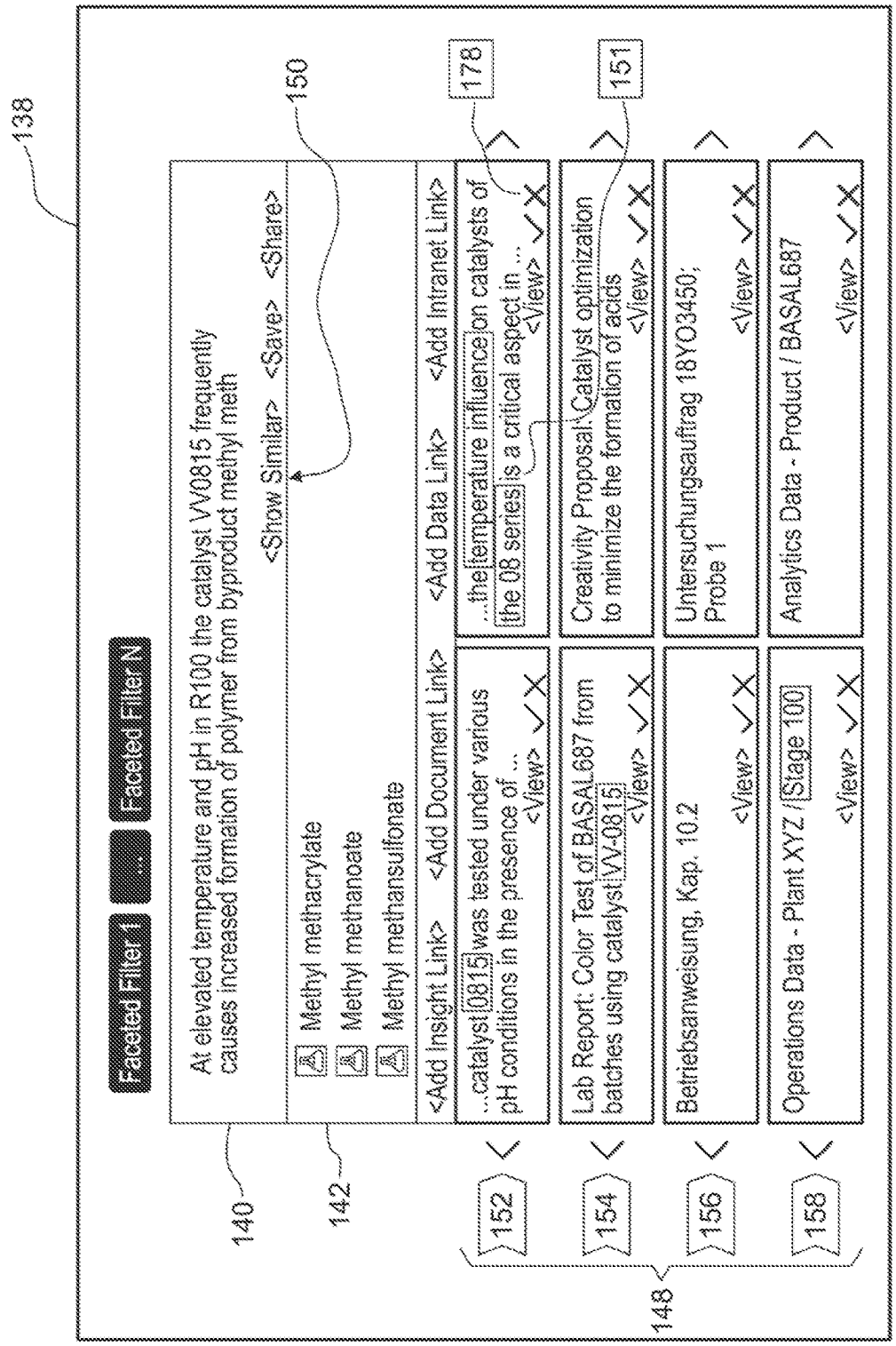

KNOWLEDGE INSIGHT CAPTURING SYSTEM

CROSS-REFERENCE TO RELATED APPLICATION(S)

This application claims the benefit of priority of European Patent Application No. 20198048.9, filed on Sep. 24, 2020, the disclosure of which is hereby incorporated by reference herein in its entirety.

TECHNICAL FIELD

The invention relates to a computer-implemented method for storage of digital information data via at least one processing unit operatively coupled to at least one database and a method for retrieval of digital information data via at least one processing unit operatively coupled to at least one database. Moreover, the invention relates to an information storage and retrieval system. The methods and the device may be used for an innovation chain from research and development to product launch such as on the technical field of chemistry. Other applications are possible.

BACKGROUND

While information retrieval systems for published information are becoming commoditized, information retrieval of company-internal information is not yet completely solved: Lack of meta data makes data integration of large numbers of document repositories exceedingly difficult. Data privacy concerns make access to these repositories very costly. In addition, a large amount of company-internal information is invisible to document-centric systems because it is captured as e-mails or personal notes. Attempts at adding user-generated content such as by a comment function and meta data such as using social tagging or folksonomy have essentially failed because users, with or without guidance, add their information in an uncoordinated fashion thus just creating new information retrieval and extraction problems on top of the existing ones.

Nikhita Vedula et al. "Enriching Taxonomies With Functional Domain Knowledge", Publication: SIGIR '18: The 41st International ACM SIGIR Conference on Research & Development in Information Retrieval, June 2018, Pages 745-754, https://doi.org/10.1145/3209978.3210000 describe a rising need to harvest domain specific knowledge in several applications is largely limited by the ability to dynamically grow structured knowledge representations, due to the increasing emergence of new concepts and their semantic relationships with existing ones. Such enrichment of existing hierarchical knowledge sources with new information to better model the "changing world" presents two-fold challenges: Detection of previously unknown entities or concepts, and insertion of the new concepts into the knowledge structure, respecting the semantic integrity of the created relationships. A framework, ETF, is described to enrich large-scale, generic taxonomies with new concepts from resources such as news and research publications. The approach learns a high-dimensional embedding for the existing concepts of the taxonomy, as well as for the new concepts. During the insertion of a new concept, this embedding is used to identify semantically similar neighborhoods within the existing taxonomy. The potential parent-child relationships linking the new concepts to the existing ones are then predicted using a set of semantic and graph features.

Xing Meng et al "Self-Supervised Contextual Language Representation of Radiology Reports to Improve the Identification of Communication Urgency", AMIA Jt Summits Transl Sci Proc. 2020; 2020: 413-421, May 30, 2020 describe that machine learning methods have recently achieved high-performance in biomedical text analysis. However, a major bottleneck in the widespread application of these methods is obtaining the required large amounts of annotated training data, which is resource intensive and time consuming. Recent progress in self-supervised learning has shown promise in leveraging large text corpora without explicit annotations. A self-supervised contextual language representation model using BERT, a deep bidirectional transformer architecture, is described to identify radiology reports requiring prompt communication to the referring physicians. The BERT was pre-trained model on a large unlabeled corpus of radiology reports and used the resulting contextual representations in a final text classifier for communication urgency. Our model achieved a precision of 97.0%, recall of 93.3%, and F-measure of 95.1% on an independent test set in identifying radiology reports for prompt communication, and significantly outperformed the previous state-of-the-art model based on word2vec representations.

Nick Tahamtan, describes in "IDC Whitepaper, How Semantic Technologies Enable Domain Experts to Steer Cognitive Applications", published in July 2017 how companies can utilize semantic technologies to build cognitive applications. The role of semantic technologies within the larger artificial intelligence (AI) technology ecosystem with the aim of raising awareness of different solution approaches is described. To succeed in a digital and increasingly self-service-oriented business environment, companies can no longer rely solely on IT professionals. Solutions like the PoolParty Semantic Suite utilize domain experts and business users to shape the cognitive intelligence of knowledge-driven applications Despite the achievements so far, there is still a need for enhanced information retrieval and knowledge management, specifically along an innovation chain from research and development to product launch.

SUMMARY

It is therefore desirable to provide methods and devices which address the above-mentioned technical challenges. Specifically, devices and methods for storage and retrieval of digital information data via at least one processing unit operatively coupled to at least one database shall be provided which allow for enhanced information retrieval and knowledge management.

This problem is addressed by a computer-implemented method for storage of digital information data via at least one processing unit operatively coupled to at least one database, a computer-implemented method for retrieval of digital information data via at least one processing unit operatively coupled to at least one database and an information storage and retrieval system with the features of the independent claims. Advantageous embodiments which might be realized in an isolated fashion or in any arbitrary combinations are listed in the dependent claims.

In a first aspect of the present invention, a computer-implemented method for storage of digital information data via at least one processing unit operatively coupled to at least one database is proposed.

The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processing unit. The term "computer", thus, may generally refer to a device or to a combination or network of devices having at least one data processing means such as at least one processing unit. The computer, additionally, may comprise one or more further components, such as at least one of a data storage device, an electronic interface or a human-machine interface.

The term "processing unit" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processing unit may be configured for processing basic instructions that drive the computer or system. As an example, the processing unit may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory. In particular, the processing unit may be a multi-core processor. Specifically, the processing unit may be or may comprise a central processing unit (CPU). Additionally or alternatively, the processing unit may be or may comprise a microprocessor, thus specifically the processing unit's elements may be contained in one single integrated circuitry (IC) chip. Additionally or alternatively, the processing unit may be or may comprise one or more application specific integrated circuits (ASICs) and/or one or more field-programmable gate arrays (FPGAs) or the like.

The term "database" as used herein is a broad term and is to be given its ordinary and customary meaning to a person of ordinary skill in the art and is not to be limited to a special or customized meaning. The term specifically may refer, without limitation, to an arbitrary collection of information and/or to a physical structure configured for storing an arbitrary collection of information. The database may be comprise at least one storage device configured for storing information. The database may be or may comprise at least one element selected from the group consisting of: at least one server, at least one server system comprising a plurality of server, at least one cloud server or cloud computing infrastructure. The method may be performed using a plurality of databases such as at least one document store and at least one knowledge base, as will be outlined in detail below. The method may be performed using one database configured for fulfilling a plurality of functionalities such as data storage and knowledge storage. For example, the document store may be integral to the knowledge base or may be an external device.

The term "storage" as used herein is a broad term and is to be given its ordinary and customary meaning to a person of ordinary skill in the art and is not to be limited to a special or customized meaning. The term specifically may refer, without limitation, to a process of recording and/or retraining of data.

The term "digital information data" as used herein is a broad term and is to be given its ordinary and customary meaning to a person of ordinary skill in the art and is not to be limited to a special or customized meaning. The term specifically may refer, without limitation, to a discrete, discontinuous representation of arbitrary information. The digital information data may comprise one or more research and/or development related data, datasets, data files, lab reports, scientific reports, journal and conference papers, reports required by regulatory mandate, for example environmental or financial regulation, web sites, comments, notes, measurement results, observations, findings, instructions, operating manuals and the like.

The processing unit is operatively coupled to the at least one database. The term "operatively coupled" as used herein is a broad term and is to be given its ordinary and customary meaning to a person of ordinary skill in the art and is not to be limited to a special or customized meaning. The term specifically may refer, without limitation, to a communication connection between the processing unit and the at least one database for one or more of transferring information, accessing to storage or controlling at least one function of the other device. The processing unit and the database may comprise at least one communication interface via which the processing unit and the database are operatively coupled. The processing unit may be configured for accessing, such as reading and writing, to storage stored in the database via the communication interface. The term "communication interface" as used herein is a broad term and is to be given its ordinary and customary meaning to a person of ordinary skill in the art and is not to be limited to a special or customized meaning. The term specifically may refer, without limitation, to an item or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface.

The computer-implemented method comprises the following steps, which may be performed in the given order. However, a different order may also be possible. Further, one or more than one or even all of the steps may be performed once or repeatedly. Further, the method steps may be performed in a timely overlapping fashion or even in parallel. The method may further comprise additional method steps which are not listed.

The method comprises the following steps:
providing, at the processing unit, at least one portion of the digital information data;
performing, via the processing unit, at least one syntactic and/or semantic search in the at least one database based upon the portion of the digital information data;
providing, via the processing unit, one or more meta-data strings in response to the at least one syntactic and/or semantic search;
receiving, at the processing unit, at least one relevant meta-data string, wherein the at least one relevant meta-data string is selected from the one or more meta-data strings;

storing, in any of the at least one database, the portion of digital information data and the at least one relevant meta-data string;

wherein the at least one relevant meta-data string is usable for a future syntactic and/or semantic search.

The term "providing" the portion of digital information data as used herein is a broad term and is to be given its ordinary and customary meaning to a person of ordinary skill in the art and is not to be limited to a special or customized meaning. The term specifically may refer, without limitation, to entering and/or uploading the digital information data.

The portion of digital information data may be an arbitrary portion of the digital information data. For example, the portion of digital information data may comprise the complete digital information data such as a complete document, e.g. comments or notices, or the portion of the digital information data may comprise at least one part of the digital information data such as at least one sentence.

The portion of digital information data may be generated by a user. The user may be a human user. The portion of digital information data may comprise at least one insight text. The term "insight" as used herein is a broad term and is to be given its ordinary and customary meaning to a person of ordinary skill in the art and is not to be limited to a special or customized meaning. The term specifically may refer, without limitation, to user owned knowledge about a specific topic. The insight may be scientific insight, research insight, development insight, legal insight, regulatory insight, business insight, operational insight, technical insight, company internal insight and the like. The term "insight" moreover may refer to an object class configured for a plurality of functionalities such as connecting documents and concepts and/or documents and documents and/or insights and insights. The term "insight text" as used herein is a broad term and is to be given its ordinary and customary meaning to a person of ordinary skill in the art and is not to be limited to a special or customized meaning. The term specifically may refer, without limitation, to a user generated text of arbitrary content. The term "generated by a user" as used herein is a broad term and is to be given its ordinary and customary meaning to a person of ordinary skill in the art and is not to be limited to a special or customized meaning. The term specifically may refer, without limitation, to the fact that the insight text is provided, in particular entered, by the user into the processing unit. The insight text may comprise one or more of a plurality of words, a plurality of characters, a plurality of numbers. The insight text may comprise one or more data, datasets, data files, lab reports, scientific reports, journal and conference papers, reports required by regulatory mandate, for example environmental or financial regulation, web sites, comments, notes, measurement results, observations, findings, instructions, operating manuals and the like.

The portion of digital information data may be provided via at least one user interface. The user interface may be operatively coupled to or may be part of the processing unit. The user interface may comprise at least one input box at which the user can enter the portion of digital information data. The term "user interface" as used herein is a broad term and is to be given its ordinary and customary meaning to a person of ordinary skill in the art and is not to be limited to a special or customized meaning. The term specifically may refer, without limitation, to a human-machine interface such as a display, a screen, a keyboard, a voice interface, touchpad, or port via which the user can provide the portion of digital information data.

The method may comprise at least one autocomplete step, wherein while providing the portion of digital information data at least one suggested vocabulary is provided from the database by the user interface depending on an input provided so far. The term "vocabulary" as used herein is a broad term and is to be given its ordinary and customary meaning to a person of ordinary skill in the art and is not to be limited to a special or customized meaning. The term specifically may refer, without limitation, to at least one of character, at least one number, at least one word, at least one part of a sentence. The term "suggested" vocabulary as used herein is a broad term and is to be given its ordinary and customary meaning to a person of ordinary skill in the art and is not to be limited to a special or customized meaning. The term specifically may refer, without limitation, to a vocabulary which is provided via the processing unit from the database, in particular the knowledge base, depending on an input entered so far by the user into the processing unit. Specifically, the processing unit may be configured for selecting at least one vocabulary stored in the database depending on similarity between the input entered so far by the user and the vocabulary. The suggested vocabulary may be adapted, e.g. changed or specified or complemented, while providing the portion of digital information data. The autocomplete step may allow facilitating contextualizing the portion of digital information data which is entered by the user. Specifically, the autocomplete step may allow directing the user to use vocabulary already used in the database and, thus, to reduce ambiguity and/or errors.

The data base may comprise the at least one document store. The term "document" as used herein is a broad term and is to be given its ordinary and customary meaning to a person of ordinary skill in the art and is not to be limited to a special or customized meaning. The term specifically may refer, without limitation, to an arbitrary digital representation of thought. The term "document" moreover may refer to an object class comprising written text and/or at least one drawing. The document may be a scientific document, a research related document, a development related document, a business-related document, a company related document, a legal document, a regulatory document, an operating manual. The document may be or may comprise at least one comment, at least one note, at least one paper, at least one report, at least one observation, at least one finding, at least one recommendation, data, at least one data set, data files, lab reports, at least one list or table of measurement results, at least one plot, at least one instruction, at least one web site, scientific reports, journal and conference papers, reports required by regulatory mandate, for example environmental or financial regulation, measurement results, observations, findings, operating manuals and the like.

The document store may be configured for storing documents and insights. Specifically, the document store may be configured for storing documents. The document store may comprise entries with content of different document classes or types such as notes, comments, papers, data sets, instructions, web sites and the like. Specifically, the document store may be configured for storing insights, in particular the digital information data, entered by the user. Entries stored in the document store may be indexed by using unique identifiers (IDs). The document store may comprise a list of indexed documents. The document store may comprise a list of indexed digital information data. Each of the documents and of the digital information data stored in the document store may have a unique identifier in the document store. The unique identifier may comprise information about the storage place within the document store.

As outlined above, the method comprises performing, via the processing unit, at least one syntactic and/or semantic search in the at least one database based upon the portion of the digital information data. Specifically, the at least one syntactic and/or the at least one semantic search is performed in the search index over all stored documents. The term "syntactic search" as used herein is a broad term and is to be given its ordinary and customary meaning to a person of ordinary skill in the art and is not to be limited to a special or customized meaning. The term specifically may refer, without limitation, to search for syntactic matches with a search term in the database. The term "semantic search" as used herein is a broad term and is to be given its ordinary and customary meaning to a person of ordinary skill in the art and is not to be limited to a special or customized meaning. The term specifically may refer, without limitation, to search considering at least one meaning of a search term. Syntactic search may be performed by a text search engine according to the state of the art. Semantic search may be performed by a semantic search engine such as a semantic network implemented for example as a graph database according to the state of the art.

The syntactic and/or semantic search may comprise performing a document search query based on the portion of digital information data. The processing unit may be configured for identifying automatically or by selection by the user, information within the portion of digital information data for which the document search is performed. The processing unit may be configured for identifying and resolving ambiguity and/or errors of the information provided by the user for which the document search is performed. For example, the processing unit may be configured for suggesting synonyms, terms, expressions, vocabulary, numbers, formulae, sentences or addresses, which may be displayed by the user interface for selection and/or approval by the user. The portion of digital information data may be compared syntactically and/or semantically to digital information data stored in the database. The document search may comprise determining a syntactic and/or semantic similarity between the portion of digital information data and the entries of the document store. A syntactic and/or semantic search index may be provided by the processing unit. The search syntactic and/or semantic search index may be a database comprising all data from the documents that has been indexed by the system, e.g. all names found in the field "author name" of all documents. Combinations may be generated by the search engine on the fly by combining different parts of the index. Via the presentation of search results the user may be allowed to look at what is already present in the database. Moreover, via the presentation of search results the user may be allowed to look at at least one context in which the search terms derived from the portion of digital information data he has entered is stored so far in the database.

A search result ranking may be provided by the processing unit. Search results may be ranked in the search result ranking by similarity to the portion of digital information data. For example, the search result ranking may comprise the top k-results of the search results with k>1.

Search results and/or the search result ranking may be displayed by the user interface. The search results may be displayed with ranked similarity starting with the most similar. For example, the user interface may comprise a "show similar" function which allows the user to look at the most similar search results. The user interface may be configured for highlighting terms that are part of the portion of digital information data and of the search results. The highlighting of terms may allow facilitating contextualizing the portion of digital information data the user has entered by visualizing search terms and their context.

The database may comprise the at least one knowledge base comprising a plurality of concepts. The term "knowledge base" as used herein is a broad term and is to be given its ordinary and customary meaning to a person of ordinary skill in the art and is not to be limited to a special or customized meaning. The term specifically may refer, without limitation, to an ontology comprising at least one hierarchy of classes, sub-classes and instances. The classes are denoted concepts herein. The concepts may be physical and/or chemical concepts, scientific concepts, legal terms, regulatory terms, technical terms and the like. The knowledge base may comprise a unique identifier for each entry. In addition to the unique ID, the knowledge base may comprise a plurality of meta-data strings. The term "meta-data string" as used herein is a broad term and is to be given its ordinary and customary meaning to a person of ordinary skill in the art and is not to be limited to a special or customized meaning. The term specifically may refer, without limitation, to data that provides information about other data. Specifically, a meta-data string may function as pointer to at least one other object which may have in turn at least one additional pointer. Each of the concepts of the knowledge base may be represented by a meta-data string. Each of the concepts may be linked to at least one entry of the document store. The meta-data string may comprise information about connected entries such as documents or insights of the document store and connection to other concepts such as higher level concepts and/or sub-concepts. As the knowledge base comprises for each entry of the document store a unique identifier, the processing unit can determine and provide the corresponding meta-data string for entries of the syntactic and/or semantic search index. The meta-data strings provided in response to the at least one syntactic and/or semantic search may comprise information about at least one concept. Entries of the document store may be connected such as by explicit citation and/or by sematic annotations of concepts in the text. The insights may connect documents and concepts and/or documents and documents and/or insights and insights. The meta-data strings comprise information about the connection between the entries of the document store.

The meta-data strings may comprise information about the document class or type of the entry of the database. For example, the meta-data string may comprise information if the entry is an indexed insight, a further document such as a paper or article, a dataset or an intranet link. The information about the object class may be displayed via the user interface. This may allow the user to select the document class or type of search results to be displayed in context with the digital information data entered by the user.

The term "relevant meta-data string" as used herein is a broad term and is to be given its ordinary and customary meaning to a person of ordinary skill in the art and is not to be limited to a special or customized meaning. The term specifically may refer, without limitation, to a meta-data string representing a selected and/or appropriate and/or related concept of the database, in particular of the knowledge base.

The relevant meta-data string may be selected automatically by the processing unit and/or the relevant meta-data string may be a user specified meta-data string. Insights may be annotated and linked to the ranked list of search results, i.e. to existing concepts of the knowledge base, by user selection of concepts and/or by automated similarity ranking using graph and text features. The at least one relevant meta-data string may be provided by contextualizing the portion of digital information data. The portion of digital information data may be annotated with at least one concept of the knowledge base.

For example, the processing unit may select the relevant meta-data string. The entered insight text may be evaluated using semantic information extraction and linked automatically to found concepts. The selection of the relevant meta-data string may comprise at least one named entity recognition. For selecting the relevant meta-data string, the processing unit may compute word and/or documents embeddings for named entities of the documents of the top-k search result. The term "word embeddings" as used herein is a broad term and is to be given its ordinary and customary meaning to a person of ordinary skill in the art and is not to be limited to a special or customized meaning. The term specifically may refer, without limitation, to a mapping of words from a vocabulary to vectors of real numbers. The term "document embeddings" as used herein is a broad term and is to be given its ordinary and customary meaning to a person of ordinary skill in the art and is not to be limited to a special or customized meaning. The term specifically may refer, without limitation, to a mapping of one or multiple words and/or phrases from a document content to vectors of real numbers. For each entity, the processing unit may identify a list of candidate concepts in the knowledge base by clustering of embeddings against concept embeddings. The term "concept embeddings" as used herein is a broad term and is to be given its ordinary and customary meaning to a person of ordinary skill in the art and is not to be limited to a special or customized meaning. The term specifically may refer, without limitation, to a mapping of concepts defined by concept entries in a knowledge base and annotated in a corpus of document content to vectors of real numbers. The processing unit may apply a learning-to-rank model using features that evaluate graph relations among candidate concepts, boost rank of candidate concepts annotated in linked documents and evaluate semantic similarities between insight text and existing text corpus of entries of the document store. The processing unit may remove candidate concepts redundant with the selected concepts. The processing unit may annotate the insight text with at least one or each of the top-k ranked candidate concepts. The processing unit may generate a ranked list of top-k concepts. The selection of the relevant meta-data string may be performed completely automatic or may comprise user interaction. The processing unit may display the ranked list of top-k concepts for confirmation or rejection by the user. The processing unit may update the ranked list of top-k concepts after confirmation or rejection by the user.

For example, the user may select the relevant meta-data string. Specifically, the user may enter an insight text into the user interface and may select concepts from suggestions while typing. The user may annotate manually the insight text with user-selected concepts. The user interface may display the search results, i.e. suggested concepts also denoted candidate concepts, and may allow the user to confirm and/or reject the suggested concepts. The processing unit may be configured for determining the suggested concepts depending on a document class or type such as the highest ranked insights, the highest ranked documents, the highest ranked web sites, the highest ranked data sets and the like. The user interface may be configured for displaying the suggested concepts depending on the document class or type such as the highest ranked insights, the highest ranked documents, the highest ranked web sites, the highest ranked data sets and the like. The selection of the relevant meta-data string may comprise adding a list of manually linked or cited documents linked to the portion of digital information data to the selected meta-data string. A list of manually linked or cited documents may be stored in the relevant meta-data string of the insight text. Non-identified text may be processed by named entity recognition, as outlined above.

The user interface may be configured for highlighting terms of the portion of digital information data that correspond to concepts of the knowledge base and/or for highlighting terms of the search results correspond to the portion of digital information data. For example, the highlighted terms that are part of the portion of digital information data and of the search results may correspond to concepts of the knowledge base. The user interface may be configured such that that the user can select, in particular confirm or reject, displayed concepts. Thus, the user can contextualize his insight text with concepts of the knowledge base. This may allow enriching the document-centric data set stored in the document store and the knowledge base and generated by syntactic information retrieval and semantic information extraction with information generated on-the-fly by the user. A cycle may be created where on the one hand the suggested vocabulary and context provided on entry allow the user to contextualize his insight on the fly. Thus, the insight can be stored in a structured way in the knowledge base. Generally, the user insights can enrich the meta-data and content of the overall data set.

Subsequent to user confirmation, in particular, confirming or rejecting, of the suggested concepts, the search result ranking may be updated. The method may comprise boosting the rank of concepts which also appear in confirmed entries of the document store. The method may comprise re-evaluating of the search results and search result ranking based on confirmation and rejection by the user and repeating confirming or rejecting by the user.

The processing unit may save the insight text. The processing unit may store the insight text in the document store. The portion of digital information data may be stored and indexed using a unique identifier in the document store. The relevant meta-data string and the unique identifier for the respective portion of digital information may be stored in the knowledge base. The processing unit may further update and/or store a semantic index for the insight text with the list of top-k concepts.

The semantic index may comprise a data table of at least four elements: a text string as found in a document in the document store, an exact position of the text string inside the text, e.g. counting characters from the beginning, a corresponding document identifier, one or more concepts from the knowledge base used to annotate the above text string. Since the processing unit has at this point updated and/or stored the document store and the knowledge base with new entries it may follow that also the semantic index keeping track of all entries has to be updated.

The syntactic search index may be updated and/or stored as well at that point. The syntactic search index may be any implementation of a class of mappings of character sequences to their positions in documents. This index may comprise all words in all texts in the document store. This mapping may be optimized for very fast look-up of character sequences across the whole text corpus.

The processing unit may store the relevant meta-data string of the insight text in the knowledge base.

The at least one relevant meta-data string is usable for a future syntactic and/or semantic search. Specifically, the structured storage of the insight text via the knowledge base may allow retrieval of digital information data stored in the document store linked to a specific concept.

The user interface may be configured for further functionalities such as sharing with other users the entered insight by using at least one chat or share function. The chat or share function may allow to limit sharing of insights to transparently defined set of users. Authorization and authentication by true name may minimize spurious user entries while the display of related documents may trigger continued user review of the content. The user interface may comprise a save function allowing the user to save the insight as described above or as described in more detail below.

In a further aspect, a computer-implemented method of retrieval of digital information data of at least one database via at least one processing unit operatively coupled to the database is proposed. The digital information data has been stored by using the method for storage of digital information data according to any one of the embodiment described above or in more detail below. Thus, with respect to terms, definitions and embodiments reference is made to the description of the method for storage of digital information data.

The computer-implemented method comprises the following steps, which may be performed in the given order. However, a different order may also be possible. Further, one or more than one or even all of the steps may be performed once or repeatedly. Further, the method steps may be performed in a timely overlapping fashion or even in parallel. The method may further comprise additional method steps which are not listed.

The method comprises
  providing, at the processing unit, at least one search query comprising one or more meta-data strings;
  providing, via the processing unit, the digital information data from the database annotated with the one or more meta-data strings.

The user may enter at least one concept of interest into the user interface. The processing unit may determine the at least one meta-data string stored in the knowledge base relating to the respective concept. The providing of the digital information data from the database may comprise evaluating the entries of the document store linked to the one or more meta-data strings. As this information is stored in the meta-data strings of the knowledge base it may be easily possible to provide the entries of the document store related to the entered concept.

In a further aspect a computer program for storage of digital information data is proposed. The computer program comprises instructions which, when the program is executed by a computer or a computer network, cause the computer or the computer network to fully or partially perform the method for storage of digital information data according to the present invention in one or more of the embodiments enclosed herein. For possible definitions of most of the terms used herein, reference may be made to the description of the computer implemented method for storage of digital information data above or as described in further detail below.

In a further aspect a computer program for s retrieval of digital information data is proposed. The computer program comprises instructions which, when the program is executed by a computer or a computer network, cause the computer or the computer network to fully or partially perform the method for retrieval of digital information data according to the present invention in one or more of the embodiments enclosed herein. For possible definitions of most of the terms used herein, reference may be made to the description of the computer implemented method for retrieval of digital information data above or as described in further detail below.

Specifically, the computer programs may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM). For example, the computer program may be stored using at least one database such as of a server or a cloud server.

Further disclosed and proposed herein is a computer program product having program code means, in order to perform the methods according to the present invention in one or more of the embodiments enclosed herein when the program is executed on a computer or computer network. Specifically, the program code means may be stored on a computer-readable data carrier and/or computer-readable storage medium. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed herein is a data carrier having a data structure stored thereon, which, after loading into a computer or computer network, such as into a working memory or main memory of the computer or computer network, may execute the methods according to the present invention in one or more of the embodiments disclosed herein.

In a further aspect an information storage and retrieval system comprising at least one database and at least one processing unit operatively coupled to the at least one database is disclosed. The processing unit is configured for providing at least one portion of the digital information data. The processing unit is configured for performing at least one syntactic and/or semantic search in the at least one database based upon the portion of the digital information data. The processing unit is configured for providing one or more meta-data strings in response to the at least one syntactic and/or semantic search. The processing unit is configured for receiving at least one relevant meta-data string. The at least one relevant meta-data string is selected from the one or more meta-data strings. The processing unit is configured for storing, in any of the at least one database, the portion of digital information data and the at least one relevant meta-data string. The at least one relevant meta-data string is usable for a future syntactic and/or semantic search.

The processing unit may be configured for providing at least one search query comprising one or more meta-data strings. The processing unit may be configured for providing the digital information data from the database annotated with the one or more meta-data strings.

The information storage and retrieval system may be configured for performing the method for storage of digital information data according to the present invention in one or more of the embodiments enclosed herein and/or the method for retrieval according to the present invention in one or more of the embodiments enclosed herein. Thus, for terms, definitions and embodiments reference is made to the method for storage of digital information data and the method for retrieval as described above or in more detail below.

The propose methods and device allow enhanced information retrieval and knowledge management through insight capturing. Especially along the innovation chain from research and development to product launch and customer service the impact of insight capturing may allow reducing time-to-market and may allow faster problem solving to respond to customer requests. Insight built on top of existing insights may allow to trigger a new level of organization wide learning that can enhance effectiveness and impact of new ideas created by users.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, non-withstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing and without excluding further possible embodiments, the following embodiments may be envisaged:

Embodiment 1. A computer-implemented method for storage of digital information data via at least one processing unit operatively coupled to at least one database, the method comprising:
  providing, at the processing unit, at least one portion of the digital information data;
  performing, via the processing unit, at least one syntactic and/or semantic search in the at least one database based upon the portion of the digital information data;
  providing, via the processing unit, one or more meta-data strings in response to the at least one syntactic and/or semantic search;
  receiving, at the processing unit, at least one relevant meta-data string, wherein the at least one relevant meta-data string is selected from the one or more meta-data strings;
  storing, in any of the at least one database, the portion of digital information data and the at least one relevant meta-data string;
wherein the at least one relevant meta-data string is usable for a future syntactic and/or semantic search.

Embodiment 2. The method according to the preceding embodiment, wherein the relevant meta-data string is selected automatic by the processing unit and/or the relevant meta-data string is a user specified meta-data string.

Embodiment 3. The method according to any one of the preceding embodiments, wherein the portion of digital information data comprises at least one insight text, wherein the insight text is generated by a user.

Embodiment 4. The method according to any one of the preceding embodiments, wherein the portion of digital information data is provided via at least one user interface.

Embodiment 5. The method according to the preceding embodiment, wherein the method comprises at least one autocomplete step, wherein while providing the portion of digital information data at least one suggested vocabulary is provided from the database by the user interface depending on an input provided so far.

Embodiment 6. The method according to any one of the preceding embodiments, wherein the data base comprises at least one document store, wherein the document store is configured for storing digital information data, wherein entries stored in the document store are indexed by using unique identifiers.

Embodiment 7. The method according to any one of the preceding embodiments, wherein the database comprises at least one knowledge base comprising a plurality of concepts, wherein the provided meta-data strings comprise information about at least one concept.

Embodiment 8. The method according to the preceding embodiment, wherein the at least one relevant meta-data string is provided by contextualizing the portion of digital information data, wherein the portion of digital information data is annotated with at least one concept of the knowledge base.

Embodiment 9. The method according to the preceding embodiment, wherein the portion of digital information data is stored and indexed using a unique identifier in the document store, wherein the relevant meta-data string is stored with the unique identifier in the knowledge base.

Embodiment 10. The method according to any one of the preceding embodiments, wherein the syntactic and/or semantic search comprises performing a document search query based on the portion of digital information data, wherein the portion of digital information data is compared syntactically and/or semantically to digital information data stored in the database, wherein a syntactic and/or semantic search index is provided by the processing unit.

Embodiment 11. The method according to the preceding embodiment, wherein a search result ranking is provided by the processing unit, wherein search results are ranked in the search result ranking by similarity to the portion of digital information data.

Embodiment 12. A computer-implemented method of retrieval of digital information data of at least one database via at least one processing unit operatively coupled to the database, wherein the digital information data has been stored by using the method for storage of digital information data according to any one of the preceding embodiments, wherein the method comprises provide, at the processing unit, at least one search query comprising one or more meta-data strings;

providing, via the processing unit, the digital information data from the database annotated with the one or more meta-data strings.

Embodiment 13. Computer program for storage of digital information data, configured for causing a computer or a computer network to fully or partially perform the method for storage of digital information data via at least one processing unit operatively coupled to at least one database according to any one of the preceding embodiments referring to a method for storage of digital information data, when executed on the computer or the computer network.

Embodiment 14. Computer program for retrieval of digital information data, configured for causing a computer or a computer network to fully or partially perform the method for retrieval according to any one of the preceding embodiments referring to a method for retrieval of digital information data, when executed on the computer or the computer network.

Embodiment 15. Information storage and retrieval system comprising at least one database and at least one processing unit operatively coupled to the at least one database, wherein the processing unit is configured for providing at least one portion of the digital information data, wherein the processing unit is configured for performing at least one syntactic and/or semantic search in the at least one database based upon the portion of the digital information data, wherein the processing unit is configured for providing one or more meta-data strings in response to the at least one syntactic and/or semantic search, wherein the processing unit is configured for receiving at least one relevant meta-data string, wherein the at least one relevant meta-data string is selected from the one or more meta-data strings, wherein the processing unit is configured for storing, in any of the at least one database, the portion of digital information data and the at least one relevant meta-data string, wherein the at least one relevant meta-data string is usable for a future syntactic and/or semantic search.

Embodiment 16. The information storage and retrieval system according to the preceding embodiment, the processing unit is configured for providing at least one search query comprising one or more meta-data strings, wherein the processing unit is configured for providing the digital information data from the database annotated with the one or more meta-data strings.

Embodiment 17. The information storage and retrieval system according to any one of the preceding embodiments referring to an information storage and retrieval system, wherein the information storage and retrieval system is configured for performing the method for storage of digital information data via at least one processing unit operatively coupled to at least one database according to any one of the preceding embodiments referring to a method for storage of digital information data and/or the method for retrieval according to any one of the preceding embodiments referring to a method for retrieval of digital information data.

BRIEF DESCRIPTION OF THE DRAWINGS

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

FIG. 2 shows an embodiment of a user interface.

DETAILED DESCRIPTION

Figure 1A:
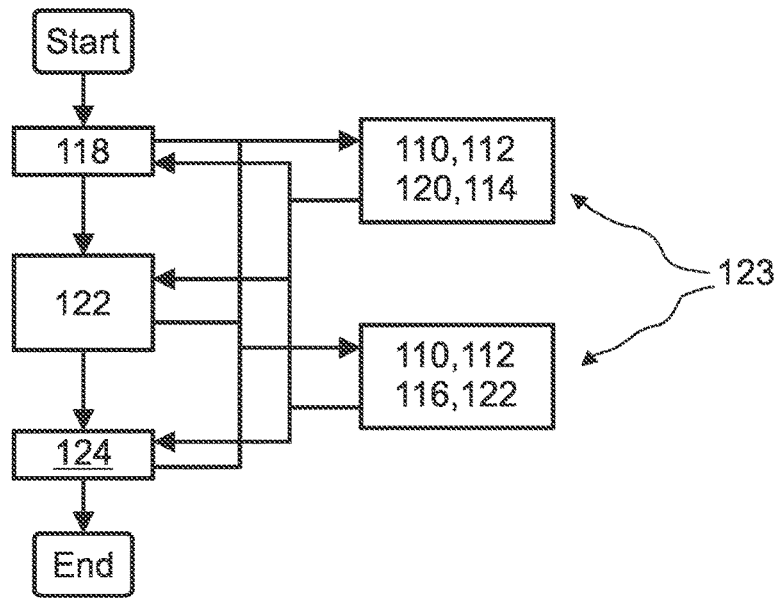
FIG. 1A shows a flow chart of an embodiment of a computer-implemented method for storage and for retrieval of digital information data according to the present invention.
Figure 1B:
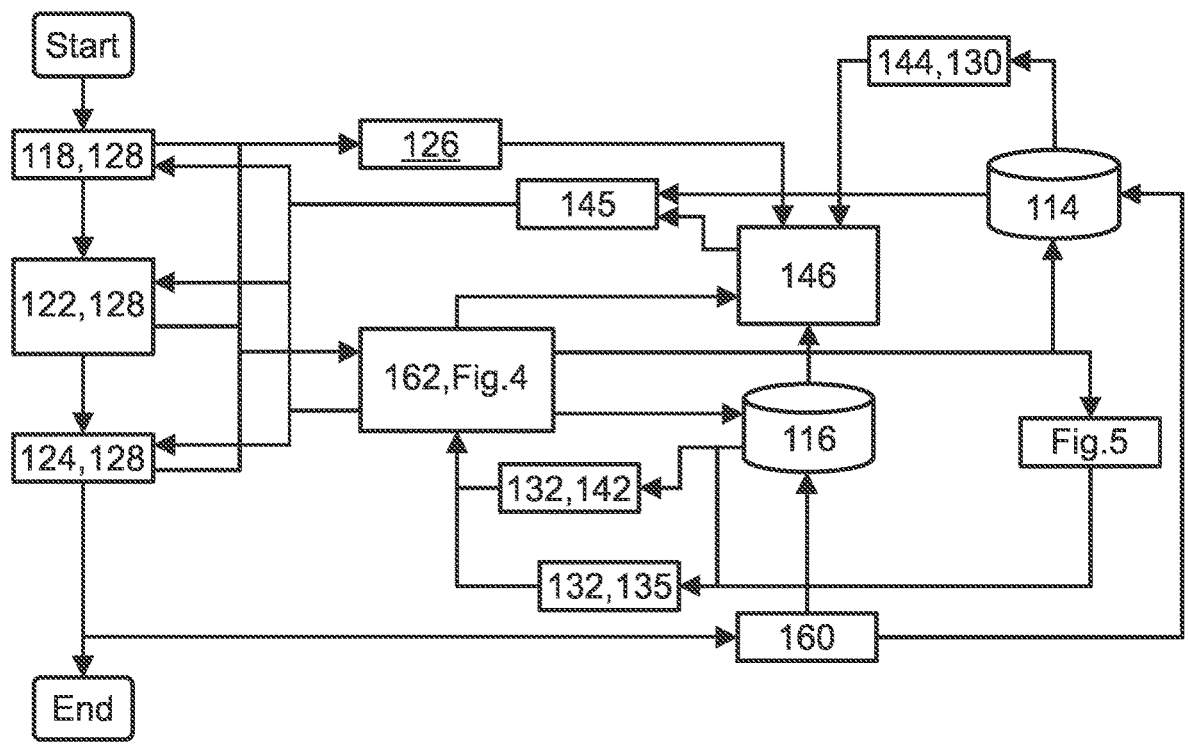
FIG. 1B shows a flow chart of a further embodiment of a computer-implemented method for storage and for retrieval of digital information data according to the present invention.

FIGS. 1A and 1B show flow chart of embodiments of the computer-implemented methods for storage and for retrieval of digital information data via at least one processing unit 110 operatively coupled to at least one database 112 according to the present invention.

The processing unit 110 may be or may comprise an arbitrary logic circuitry configured for performing basic operations of a computer or system, and/or, generally, to a device which is configured for performing calculations or logic operations. In particular, the processing unit 110 may be configured for processing basic instructions that drive the computer or system. As an example, the processing unit 110 may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory. In particular, the processing unit 110 may be a multicore processor. Specifically, the processing unit 110 may be or may comprise a central processing unit (CPU). Additionally or alternatively, the processing unit 110 may be or may comprise a microprocessor, thus specifically the processing unit's elements may be contained in one single integrated circuitry (IC) chip. Additionally or alternatively, the processing unit 110 may be or may comprise one or more application specific integrated circuits (ASICs) and/or one or more field-programmable gate arrays (FPGAs) or the like.

The database 112 may be or may comprise an arbitrary collection of information and/or to a physical structure configured for storing an arbitrary collection of information. The database 112 may be comprise at least one storage device configured for storing information. The database 112 may be or may comprise at least one element selected from the group consisting of: at least one server, at least one server system comprising a plurality of server, at least one cloud server or cloud computing infrastructure. The method may be performed using a plurality of databases 112 such as at least one document store 114 and at least one knowledge base 116, see e.g. FIG. 1B. The method may be performed using one database 112 configured for fulfilling a plurality of functionalities such as data storage and knowledge storage. For example, the document store 114 may be integral to the knowledge base 116 or may be an external device.

The digital information data may be a discrete, discontinuous representation of arbitrary information. The digital information data may comprise one or more of research and/or development related data, datasets, data files, lab reports, scientific reports, journal and conference papers, reports required by regulatory mandate, for example environmental or financial regulation, web sites, comments, notes, measurement results, observations, findings, instructions, operating manuals and the like.

The processing unit 110 is operatively coupled to the at least one database 112. Specifically, a communication connection is present between the processing unit 110 and the at least one database 112 for one or more of transferring information, accessing to storage or controlling at least one function of the other device. The processing unit 110 and the database 112 may comprise at least one communication interface via which the processing unit 110 and the database 112 are operatively coupled. The processing unit 110 may be configured for accessing, such as reading and writing, to storage stored in the database via the communication interface. The communication interface may be or may comprise an item or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface.

In the flowchart of FIG. 1A, a rough overview of the methods is given, wherein in FIG. 1B the methods are depicted in more detail.

For example, during research and/or development a problem may occur, denoted with reference number 118. A user, such as the researcher or developer, may generate a document search query 126 (see FIG. 1B) to a document search engine 120. The document search engine 120 may return search results, e.g. an overview of documents related to said document search query 126, by using a structured content of the knowledge base 116 as will be described in more detail below. Considering these search result, the user may work (reference number 121) on a solution of the problem and may gain an insight with respect to said problem. The user may generate a solution report (reference number 124). Subsequently, the user stores the gained insight, e.g. the solution report, in the database 112. In particular, the insight is stored in the document store 114 of the document search engine 120 with a unique identifier. Moreover, at least one relevant meta-data string may be stored with the unique identifier in the knowledge base 116 of an insight capturing engine 122. The stored insight and meta-data string can be used for evaluating and/or answering future document search queries 126. The document search engine 120 and the insight capturing engine 122 may form an information storage and retrieval system 123.

FIG. 1B shows the process flow of the methods in more details.

The method for storage of digital information data comprises the following steps:
- (denoted with reference number 128) providing, at the processing unit 110, at least one portion of the digital information data;
- (denoted with reference number 130) performing, via the processing unit 110, at least one syntactic and/or semantic search in the at least one database 112 based upon the portion of the digital information data;
- (denoted with reference number 132) providing, via the processing unit 110, one or more meta-data strings in response to the at least one syntactic and/or semantic search;
- (denoted with reference number 134, shown in FIG. 4) receiving, at the processing unit 110, at least one relevant meta-data string, wherein the at least one relevant meta-data string is selected from the one or more meta-data strings;
- (denoted with reference number 136) storing, in any of the at least one database 112, the portion of digital information data and the at least one relevant meta-data string;

wherein the at least one relevant meta-data string is usable for a future syntactic and/or semantic search.

The providing the portion of digital information data 128 may comprise entering and/or uploading the digital information data. The portion of digital information data may be an arbitrary portion of the digital information data. For example, the portion of digital information data may comprise the complete digital information data such as a complete document, e.g. comments or notices, or the portion of the digital information data may comprise at least one part of the digital information data such as at least one sentence.

The portion of digital information data may be generated by a user, such as the solution report. The user may be a human user. The portion of digital information data may comprise at least one insight text. The insight may be user owned knowledge about a specific topic. The insight may be scientific insight, research insight, development insight, legal insight, regulatory insight, business insight, operational insight, technical insight, company internal insight and the like. The insight text may be a user generated text of arbitrary content. The generating by a user may comprise providing the insight text, in particular entering, by the user into the processing unit 110. The insight text may comprise one or more of a plurality of words, a plurality of characters, a plurality of numbers. The insight text may comprise one or more data, datasets, data files, lab reports, scientific reports, journal and conference papers, reports required by regulatory mandate, for example environmental or financial regulation, web sites, comments, notes, measurement results, observations, findings, instructions, operating manuals and the like.

The portion of digital information data may be provided via at least one user interface 138, which is depicted in FIG. 2. There are chevrons on both sides of a suggestion list, indicating a gallery of boxes with suggestions that can be browsed in left and right direction. The user interface 138 may be operatively coupled to or may be part of the processing unit 110. The user interface 138 may comprise at least one input box 140 at which the user can enter the portion of digital information data. The user interface 138 may be or may comprise a human-machine interface such as a display, a screen, a keyboard, a voice interface, touchpad, or port via which the user can provide the portion of digital information data.

The method for storing the portion of digital information data may comprise at least one autocomplete step, see FIG. 2. While providing the portion of digital information data 128 at least one suggested vocabulary 142 may be provided from the database 112 by the user interface 138 depending on an input provided so far. The suggested vocabulary 142 may be or may comprise at least one of character, at least one number, at least one word, at least one part of a sentence. The suggested vocabulary 142 may be provided via the processing unit 110 from the database 112, in particular the knowledge base 116, depending on an input entered so far by the user into the processing unit 110. Specifically, the processing unit 110 may be configured for selecting at least one vocabulary stored in the database 112 depending on similarity between the input entered so far by the user and the vocabulary. The suggested vocabulary 142 may be adapted, e.g. changed or specified or complemented, while providing the portion of digital information data. The autocomplete step may allow facilitating contextualizing the portion of digital information data which is entered by the user. Specifically, the autocomplete step may allow directing the user to use vocabulary already used in the database and, thus, to reduce ambiguity and/or errors.

As outlined above, the data base 112 may comprise the at least one document store 114. The document store 114 may comprise a collection of documents and insights. The document may be a scientific document, a research related document, a development related document, a business-related document, a company related document, a legal document, a regulatory document, an operating manual. The document may be or may comprise at least one comment, at least one note, at least one paper, at least one report, at least one observation, at least one finding, at least one recommendation, data, at least one data set, data files, lab reports, at least one list or table of measurement results, at least one plot, at least one instruction, at least one web site, scientific reports, journal and conference papers, reports required by regulatory mandate, for example environmental or financial regulation, measurement results, observations, findings, operating manuals and the like.

The document store 114 may be configured for storing documents and insights. Specifically, the document store 114 may be configured for storing documents. The document store 114 may comprise entries with content of different document classes or types such as notes, comments, papers, data sets, instructions, web sites and the like. Specifically, the document store 114 may be configured for storing insights, in particular the digital information data, entered by the user. Entries stored in the document store 114 may be indexed by using unique identifiers (IDs). The document store 114 may comprise a list of indexed documents. The document store 114 may comprise a list of indexed digital information data. Each of the documents and of the digital information data stored in the document store 114 may have a unique identifier in the document store 114. The unique identifier may comprise information about the storage place within the document store 114.

As outlined above, the method for storing the portion of digital information data comprises performing 130, via the processing unit 110, at least one syntactic and/or semantic search in the at least one database 112 based upon the portion of the digital information data. Specifically, the at least one syntactic and/or the at least one semantic search is performed in the search index 144. The syntactic search may be a search for syntactic matches with a search term in the database. The semantic search may be a search considering at least one meaning of a search term. Syntactic search may be performed by a text search engine according to the state of the art. Semantic search may be performed by a semantic search engine such as a semantic network implemented for example as a graph database according to the state of the art.

The syntactic and/or semantic search may comprise performing the document search query 126 based on the portion of digital information data. The processing unit 110 may be configured for identifying automatically or by selection by the user, information within the portion of digital information data for which the document search is performed. The processing unit 110 may be configured for identifying and resolving ambiguity and/or errors of the information provided by the user for which the document search is performed. For example, the processing unit 110 may be configured for suggesting synonyms, terms, expressions, vocabulary, numbers, formulae, sentences or addresses, which may be displayed by the user interface for selection and/or approval by the user. The portion of digital information data may be compared syntactically and/or semantically to digital information data stored in the database 112. The document search may comprise determining a syntactic and/or semantic similarity between the portion of digital information data and the entries of the document store 114. A syntactic and/or semantic search index 144 may be provided by the processing unit 110. The search syntactic and/or semantic search index 144 may be a database comprising all data from the documents that has been indexed by the system, e.g. all names found in the field "author name" of all documents. Combinations may be generated by the search engine 120 on the fly by combining different parts of the index. Via a presentation 145 of search results the user may be allowed to look at what is already present in the database. Moreover, via presentation of search results the user may be allowed to look at least one context in which the search terms derived from the portion of digital information data he has entered is stored so far in the database 112.

A search result ranking may be provided by the processing unit, denoted with reference number 146. Search results may be ranked in the search result ranking by similarity to the portion of digital information data. For example, the search result ranking may comprise the top k-results of the search results.

Search results and/or the search result ranking may be displayed by the user interface 138, denoted with reference number 148. The search results may be displayed with ranked similarity starting with the most similar. For example, the user interface 138 may comprise a "show similar" function 150 which allows the user to look at the most similar search results. The user interface 138 may be configured for highlighting terms 151 that are part of the portion of digital information data and of the search results. The highlighting of terms may allow facilitating contextualizing the portion of digital information data the user has entered by visualizing search terms and their context.

Figure 3:
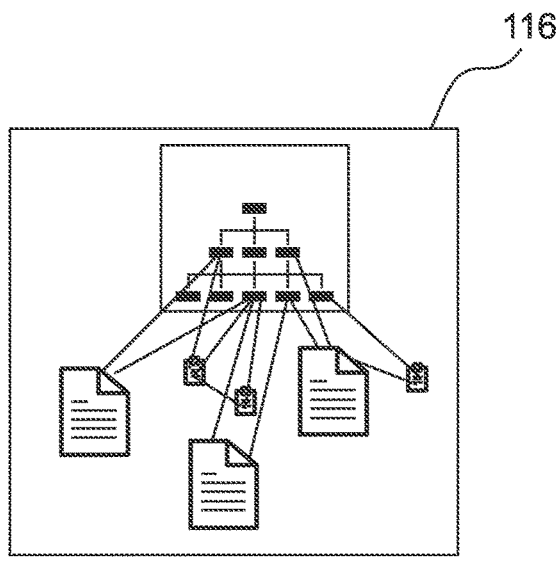
FIG. 3 shows an embodiment of a knowledge base.

As outlined above, the database 112 may comprise the at least one knowledge base 116 comprising a plurality of concepts. An exemplary embodiment of a knowledge base 116 is depicted in highly schematic fashion in FIG. 3. The knowledge base 116 may be an ontology comprising at least one hierarchy of classes, sub-classes and instances. The classes are denoted concepts herein. The concepts may be physical and/or chemical concepts, scientific concepts, legal terms, regulatory terms, technical terms and the like. The knowledge base 116 may comprise a unique identifier for each entry. In addition to the unique identifier, the knowledge base 116 may comprise a plurality of meta-data strings. The meta-data string may be or may comprise data that provides information about other data. Specifically, a meta-data string may function as pointer to at least one other object which may have in turn at least one additional pointer. Each of the concepts of the knowledge base 116 may be represented by a meta-data string. Each of the concepts may be linked to at least one entry of the document store 114. The meta-data string may comprise information about connected entries such as documents or insights of the document store 114 and connection to other concepts such as higher level concepts and/or sub-concepts. As the knowledge base 116 comprises for each entry of the document store 114 a unique identifier, the processing unit 110 can determine and provide the corresponding meta-data string for entries of the syntactic and/or semantic search index. The meta-data strings provided 132 in response to the at least one syntactic and/or semantic search may comprise information about at least one concept such as vocabulary suggestions 142 or context suggestions 135. Entries of the document store 114 may be connected such as by explicit citation and/or by sematic annotations of concepts in the text. The insights may connect documents and concepts and/or documents and documents and/or insights and insights. The meta-data strings comprise information about the connection between the entries of the document store 114.

The meta-data strings may comprise information about the document class or type of the entry of the database. For example, the meta-data string may comprise information if the entry is an indexed insight, a further document such as a paper or article, a dataset or an intranet link. The information about the object class may be displayed via the user interface 138. This may allow the user to select the document class or type of search results to be displayed in context with the digital information data entered by the user. For example, the user interface 138 may comprise a distinction between "top insights" 152, "top documents" 154, "top web sites" 156 and "top datasets" 158. The user can activate an "add insight link", "add document link", "add data link" or "add intranet link" function offered by the user interface 138. This may allow the user to add additional digital information data by document class or type to the entered portion of digital information data and, thus, to allow structured storing of insight linked to typed attachments.

The relevant meta-data string may be a meta-data string representing a selected and/or appropriate and/or related concept of the database 112, in particular of the knowledge base 116.

The relevant meta-data string may be selected automatically 160 by the processing unit 110 and/or the relevant meta-data string may be a user specified meta-data string 162. Insights may be annotated and linked to the ranked list of search results, i.e. to existing concepts of the knowledge base 116, by user selection of concepts 162 and/or by automated similarity ranking using graph and text features 160. The at least one relevant meta-data string may be provided by contextualizing the portion of digital information data. The portion of digital information data may be annotated with at least one concept of the knowledge base.

For example, the processing unit 110 may select the relevant meta-data string. The entered insight text may be evaluated using semantic information extraction and linked automatically to found concepts. The selection of the relevant meta-data string may comprise at least one named entity recognition 164. The named entity recognition 164 is shown as part of the user selection of FIG. 4. For selecting the relevant meta-data string, the processing unit 110 may compute word and/or documents embeddings for named entities of the documents of the top-k search result (denoted with reference number 166). The word embeddings may be or may comprise a mapping of words from a vocabulary to vectors of real numbers. The document embeddings may be or may comprise a mapping of one or multiple words and/or phrases from a document content to vectors of real numbers. For each entity, the processing unit 110 may identify a list of candidate concepts in the knowledge base by clustering of embeddings against concept embeddings (denoted with reference number 168). The concept embeddings may be or may comprise a mapping of concepts defined by concept entries in a knowledge base and annotated in a corpus of document content to vectors of real numbers. The processing unit 110 may apply a learning-to-rank model (denoted with reference number 170) using features that evaluate graph relations among candidate concepts, boost rank of candidate concepts annotated in linked documents and evaluate semantic similarities between insight text and existing text corpus of entries of the document store. The processing unit 110 may remove 172 candidate concepts redundant with the user-selected concepts. The processing unit 110 may annotate 174 the insight text with at least one or each of the top-k ranked candidate concepts. The processing unit 110 may generate 176 a ranked list of top-k concepts. The selection of the relevant meta-data string may be performed completely automatic or may comprise user interaction. The processing unit 110 may display the ranked list of top-k concepts for confirmation or rejection 178 by the user, as depicted in FIG. 2. The processing unit may update the ranked list of top-k concepts after confirmation or rejection by the user.

Figure 4:
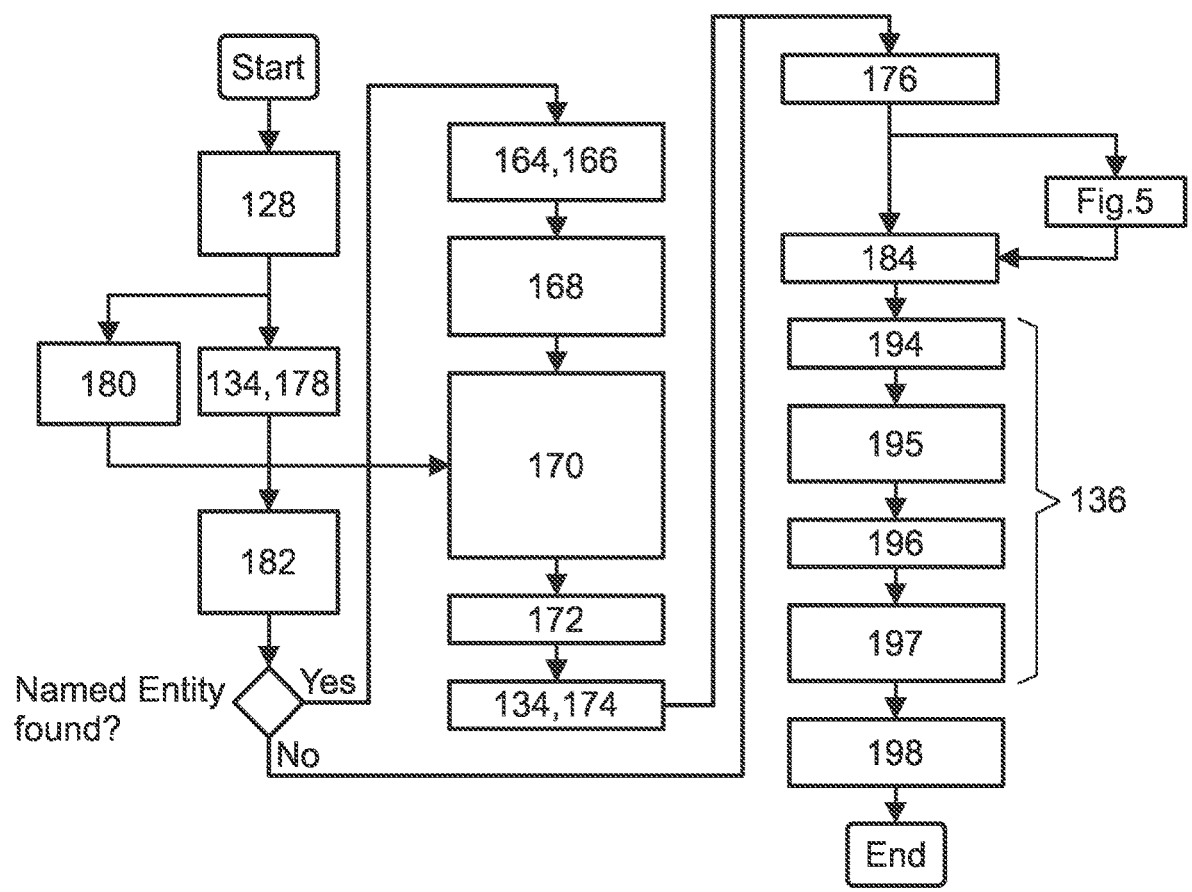
FIG. 4 shows an embodiment of automated linking of an insight text to existing concepts.

As further shown in FIG. 4, the user may select the relevant meta-data string 162. Specifically, the user may enter 128 an insight text into the user interface 138 and may select concepts from suggestions while typing. The user may annotate manually 178 the insight text with user-selected concepts. As outlined above, the user interface 138 may display the search results, i.e. suggested concepts also denoted candidate concepts, and may allow the user to confirm and/or reject the suggested concepts. The processing unit 110 may be configured for determining the suggested concepts depending on a document class or type such as the highest ranked insights, the highest ranked documents, the highest ranked web sites, the highest ranked data sets and the like. The user interface 138 may be configured for displaying the suggested concepts depending on the document class or type such as the highest ranked insights, the highest ranked documents, the highest ranked web sites, the highest ranked data sets and the like. The selection of the relevant meta-data string may comprise adding a list of manually linked or cited documents linked to the portion of digital information data to the selected meta-data string. A list of manually linked or cited documents may be stored 180 in the relevant meta-data string of the insight text. Non-identified text may be processed 182 by named entity recognition, as outlined above.

The user interface may be configured for highlighting terms 151 of the portion of digital information data that correspond to concepts of the knowledge base and/or for highlighting terms 151 of the search results correspond to the portion of digital information data. For example, the highlighted terms that are part of the portion of digital information data and of the search results may correspond to concepts of the knowledge base 116. The user interface 138 may be configured such that that the user can select, in particular confirm or reject, displayed concepts. Thus, the user can contextualize his insight text with concepts of the knowledge base 116. This may allow enriching the document-centric data set stored in the document store 114 and the knowledge base 116 and generated by syntactic information retrieval and semantic information extraction with information generated on-the-fly by the user. A cycle may be created where on the one hand the suggested vocabulary and context provided on entry allow the user to contextualize his insight on the fly. Thus, the insight can be stored in a structured way in the knowledge base 116. Generally, the user insights can enrich the meta-data and content of the overall data set.

Figure 5:
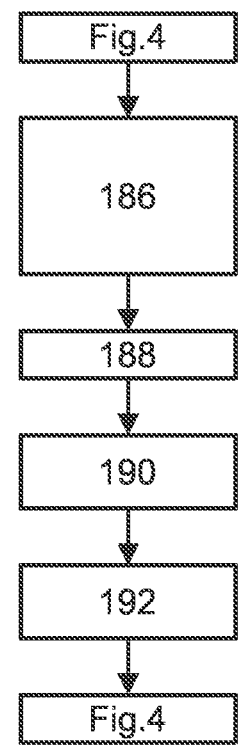
FIG. 5 shows a flowchart for a process of displaying a ranked list of concepts for user confirmation.

Subsequent to user confirmation, in particular, confirming or rejecting, of the suggested concepts, the search result ranking may be updated 184. As shown in FIG. 5, a list of top-k-ranked documents linked to top-k-ranked concepts may be generated 186 by reevaluating semantic similarities computed in the previous step (FIG. 4). The list of documents may be displayed 188 from each document class in the user interface 138. The processing unit 110 may receive 190 user confirmation or rejection of documents in the context with the insight text. The processing unit 110 may boost 192 the rank of candidate concepts annotated in confirmed documents.

Back to FIG. 4, the processing unit 110 may save 194 the insight text. The processing unit 110 may store the insight text in the document store 114 (denoted with reference number 195). The portion of digital information data may be stored and indexed using a unique identifier in the document store 114. The relevant meta-data string and the unique identifier for the respective portion of digital information may be stored in the knowledge base 116. The processing unit 110 may further update and/or store 198 a semantic index for the insight text with the list of top-k concepts.

The semantic index may comprise a data table of at least four elements: a text string as found in a document in the document store 114, an exact position of the text string inside the text, e.g. counting characters from the beginning, a corresponding document identifier, one or more concepts from the knowledge base used to annotate the above text string. Since the processing unit 110 has at this point updated and/or stored the document store 114 and the knowledge base 116 with new entries it may follow that also the semantic index keeping track of all entries has to be updated and/or stored 198.

The syntactic search index may be updated and/or stored 196 as well at that point. The syntactic search index may be any implementation of a class of mappings of character sequences to their positions in documents. This index may comprise all words in all texts in the document store 114. This mapping may be optimized for very fast look-up of character sequences across the whole text corpus.

The processing unit 110 may store 197 the relevant meta-data string of the insight text in the knowledge base 116.

The at least one relevant meta-data string is usable for a future syntactic and/or semantic search. Specifically, the structured storage of the insight text via the knowledge base 116 may allow retrieval of digital information data stored in the document store 114 linked to a specific concept.

The user interface 138 may be configured for further functionalities such as sharing with other users the entered insight by using at least one chat or share function. The chat or share function may allow to limit sharing of insights to transparently defined set of users. Authorization and authentication by true name may minimize spurious user entries while the display of related documents may trigger continued user review of the content. The user interface 138 may comprise a save function allowing the user to save the insight as described above.

The computer-implemented method of retrieval of digital information data which has been stored by using the method for storage of digital information data according to the present invention comprises the following steps:
  providing, at the processing unit 110, at least one search query 126 comprising one or more meta-data strings;
  providing 145, via the processing unit 110, the digital information data from the database annotated with the one or more meta-data strings.

The user may enter at least one concept of interest into the user interface 138. The processing unit 110 may determine the at least one meta-data string stored in the knowledge base 116 relating to the respective concept. The providing of the digital information data from the database 112 may comprise evaluating the entries of the document store 114 linked to the one or more meta-data strings. As this information is stored in the meta-data strings of the knowledge base 116 it may be easily possible to provide the entries of the document store 114 related to the entered concept.

Figure 1C:
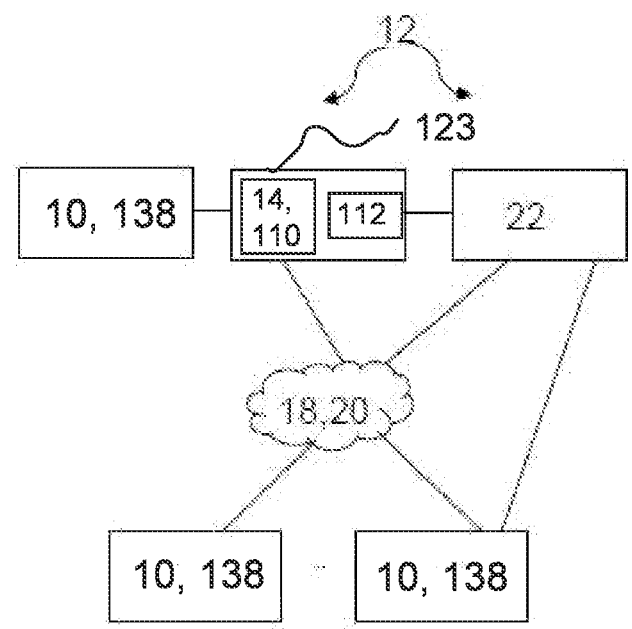
FIG. 1C shows an exemplary system and a network connection to a client that hosts the user interface according to the present invention.

FIG. 1C show an exemplary system 12, in particular an internet-based system, comprising the information storage and retrieval system 123, for storage of digital information data via at least one processing unit 110, coupled to at least one database 112 and retrieval of digital information data of at least one database 112 via the at least one processing unit 110. The Internet-based system 12 may comprise a server 14, e.g. comprising the processing unit 110, which can be accessed via a communication interface 18 such as a network 20, such as the Internet, by one or more client devices 10. The client devices 10 may be computer terminals accessible by a user and may be customized devices, such as data entry kiosks, or general purpose devices, such as a personal computer. The client device 10 can hosts the user interface 138. Preferably, the server 14 is an HTTP server and is accessed via conventional Internet web-based technology.

The server 14 may be connected to a further client device 10. The server 14 can be directly or indirectly connected through the network, to a manufacturing facility 22. The server 14 may be configured to trigger a request of initiating the method for storage of digital information data and/or retrieval of digital information data. The manufacturing facility 22 can be located proximate to the server 14 and be part of an overall customized ordering and manufacturing system. Alternatively, manufacturing facility 22 may be remotely located from both the server 14 and the client devices 10. For example, the retrieved digital information data can be forwarded directly, such as via e-mail, to the manufacturing facility 22. In yet a further embodiment the manufacturing facility 22 can be located proximate a client device 10. This arrangement is particularly well suited for a kiosk based on-demand manufacturing system, e.g., such as may be located in a point-of-sale establishment. These three potential connections to the manufacturing facility 22 are illustrated in FIG. 1C. Multiple manufacturing facilities 22 located at different places may be provided or only one connection may be implemented.

LIST OF REFERENCE NUMBERS 110 processing unit
112 database
114 document store
116 knowledge base 118 problem
120 document search engine
121 Work on solution
122 insight capturing engine
123 information storage and retrieval system
124 generate a solution report
126 document search query
128 Providing at least one portion of the digital information data
130 Performing at least one syntactic and/or semantic search
132 Providing one or more meta-data strings
134 Receiving at least one relevant meta-data string
135 context suggestions
136 storing
138 user interface
140 input box
142 suggested vocabulary
144 syntactic and/or semantic search index
145 Providing the digital information data from the database annotated with the one or more meta-data strings
146 Providing search result ranking
148 Display search result
150 "show similar" function
151 highlighting terms
152 "top insights"
154 "top documents"
156 "top web sites"
158 "top datasets"
160 select relevant meta-data string automatic
162 user specified meta-data string
164 named entity recognition
166 compute word and/or documents embeddings
168 identify a list of candidate concepts
170 apply a learning-to-rank model
172 Remove candidate concepts
174 annotate the insight text
176 generate a ranked list of top-k concepts
178 confirmation or rejection
180 Storing a list of manually linked or cited documents
182 Processing non-identified text
184 Update search result ranking
186 Generate a list of top-k-ranked documents linked to top-k-ranked concepts
188 Display list of documents
190 receive user confirmation or rejection of documents
192 Boost rank
194 Save insight text
195 store the insight text in the document store
196 update the syntactic search index
197 store meta-data strings in knowledge base
198 update a semantic index
10 Client device
12 system
14 server
18 communication interface
20 network
22 manufacturing facility

What is claimed is:

1. A computer-implemented method for storage of digital information data via at least one processing unit operatively coupled to at least one database, the method comprising:
providing, at the processing unit, at least one portion of the digital information data;
performing, via the processing unit, at least one syntactic and/or semantic search in the at least one database based upon the portion of the digital information data;
providing, via the processing unit, one or more meta-data strings in response to the at least one syntactic and/or semantic search;
receiving, at the processing unit, at least one relevant meta-data string, wherein the at least one relevant meta-data string is selected from the one or more meta-data strings; and
storing, in any of the at least one database, the portion of digital information data and the at least one relevant meta-data string,
wherein the at least one relevant meta-data string is usable for a future syntactic and/or semantic search, wherein the digital information data comprises unstructured data, wherein the at least one relevant meta-data string includes at least one named entity recognition; and
selecting the at least one relevant meta-data string includes the processing unit computing word and/or document embeddings for a named entity of a document.

2. The method according to claim 1, wherein the relevant meta-data string is selected automatically by the processing unit and/or the relevant meta-data string is a user specified meta-data string.

3. The method according to claim 1, wherein the portion of digital information data comprises at least one insight text, wherein the insight text is generated by a user.

4. The method according to claim 1, wherein the portion of digital information data is provided via at least one user interface.

5. The method according to claim 4, wherein the method comprises at least one autocomplete step, wherein while providing the portion of digital information data at least one suggested vocabulary is provided from the database by the user interface depending on an input provided so far.

6. The method according to claim 1, wherein the database comprises at least one document store, wherein the document store is configured for storing digital information data, wherein entries stored in the document store are indexed by using unique identifiers.

7. The method according to claim 6, wherein the database comprises at least one knowledge base comprising a plurality of concepts, wherein the provided meta-data strings comprise information about at least one concept.

8. The method according to claim 7, wherein the at least one relevant meta-data string is provided by contextualizing the portion of digital information data, wherein the portion of digital information data is annotated with at least one concept of the knowledge base.

9. The method according to claim 8, wherein the portion of digital information data is stored and indexed using a unique identifier in the document store, wherein the relevant meta-data string is stored with the unique identifier in the knowledge base.

10. The method according to claim 1, wherein the syntactic and/or semantic search comprises performing a document search query based on the portion of digital information data, wherein the portion of digital information data is compared syntactically and/or semantically to digital information data stored in the database (112), wherein a syntactic and/or semantic search index is provided by the processing unit (110).

11. The method according to claim 10, wherein a search result ranking is provided by the processing unit, wherein search results are ranked in the search result ranking by similarity to the portion of digital information data.

12. A computer-implemented method of retrieval of digital information data of at least one database via at least one processing unit operatively coupled to the database, wherein the digital information data has been stored by using the method of claim 1 for storage of digital information data, wherein the method comprises:

provide, at the processing unit, at least one search query comprising one or more meta-data strings; and providing, via the processing unit, the digital information data from the database annotated with the one or more meta-data strings.

13. An information storage and retrieval system comprising at least one database and at least one multicore processor operatively coupled to the at least one database, wherein the multicore processor is configured for providing at least one portion of digital information data, wherein the multicore processor is configured for performing at least one syntactic and/or semantic search in the at least one database based upon the portion of the digital information data, wherein the multicore processor is configured for providing one or more meta-data strings in response to the at least one syntactic and/or semantic search, wherein the multicore processor is configured for receiving at least one relevant meta-data string, wherein the at least one relevant meta-data string is selected from the one or more meta-data strings, wherein the multicore processor is configured for storing, in any of the at least one database, the portion of digital information data and the at least one relevant meta-data string, wherein the at least one relevant meta-data string is usable for a future syntactic, wherein the at least one relevant meta-data string includes at least one named entity recognition; and selecting the at least one relevant meta-data string includes the processing unit computing word and/or document embeddings for a named entity of a document.

14. The information storage and retrieval system according to claim 13, the multicore processor is configured for providing at least one search query comprising one or more meta-data strings, wherein the multicore processor is configured for providing the digital information data from the database annotated with the one or more meta-data strings.

15. The information storage and retrieval system, wherein the information storage and retrieval system is configured for performing the method of claim 1.

\* \* \* \* \*